March 29, 1932.  J. F. O'CONNOR  1,851,590
FRICTION SHOCK ABSORBING MECHANISM
Filed April 15, 1929
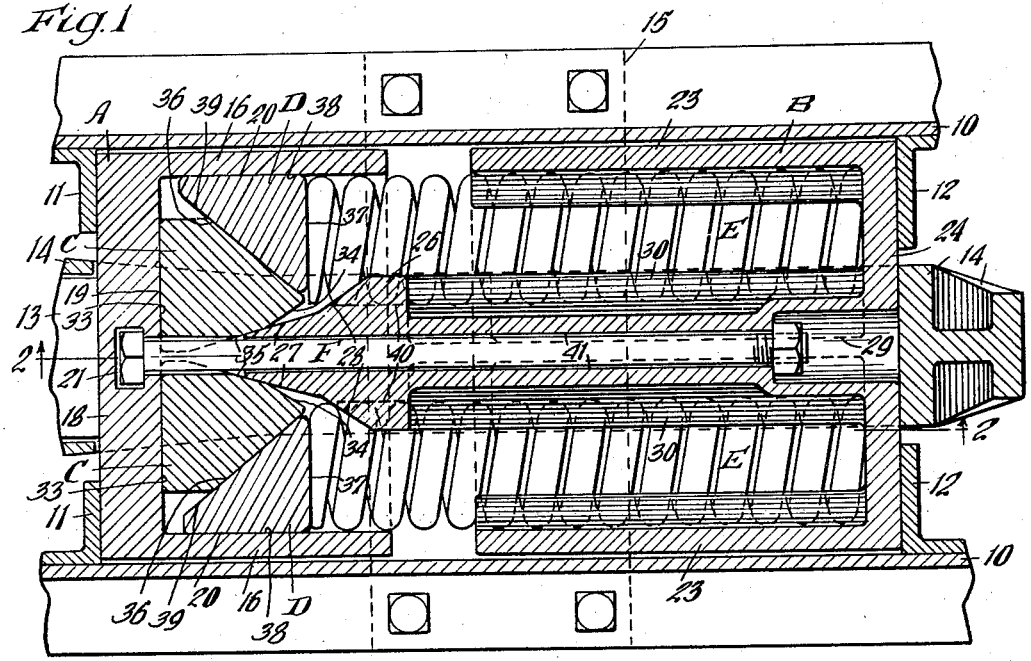
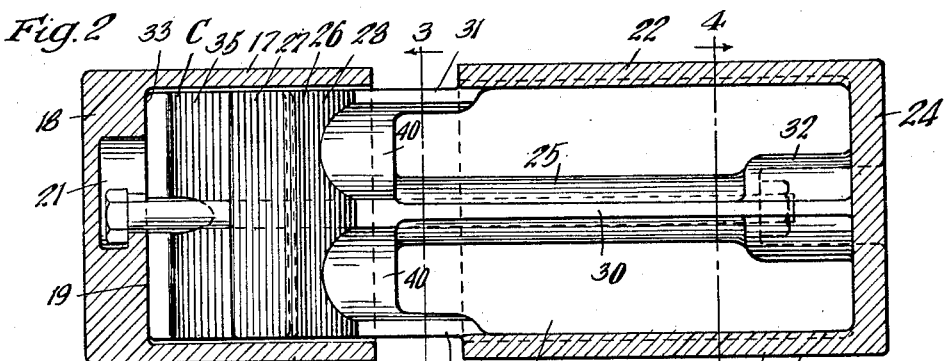
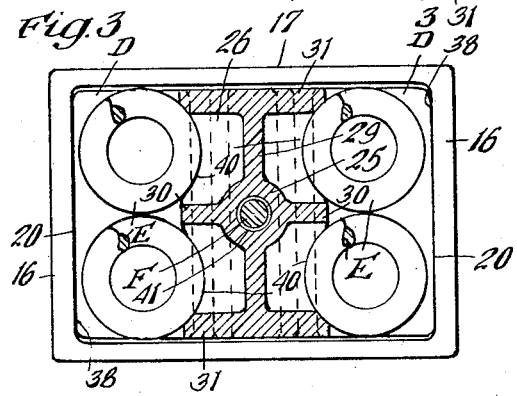
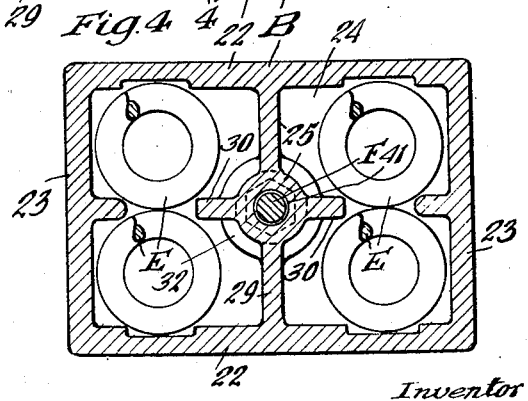
Witness
Wm. Geiger
Inventor
John F. O'Connor
By Joseph Harris
His Atty.

Patented Mar. 29, 1932

1,851,590

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed April 15, 1929.  Serial No. 355,000.

This invention relates to improvements in friction shock absorbing mechanisms.

One object of the invention is to provide a high capacity friction shock absorbing mechanism, especially adapted for railway draft riggings, having graduated action with increased resistance, as the compression progresses, produced by a plurality of wedge friction members, certain of which are spring resisted and have sliding engagement with friction means and have movement imparted thereto by the remaining wedge members which have wedging engagement with cooperating wedge means, wherein the last named wedge members and means have cooperating sets of wedge faces disposed at an inclination to each other and acting in sequence to effect movement of the friction wedge blocks during the last part of the compression stroke to a greater extent than during the first part thereof, thereby also correspondingly compressing the spring resistance of the mechanism.

A further object of the invention is to provide a friction shock absorbing mechanism, including a follower casing having transversely and longitudinally disposed friction surfaces; a column member having wedge faces arranged at different inclinations to the longitudinal axis of the mechanism; friction wedge means having frictional engagement with the transverse friction surface of the casing, the friction wedge means also having wedge faces respectively cooperating with the wedge faces of the column and acting in succession, effecting, during the last part of the compression stroke of the mechanism, more rapid lateral movement of the friction wedge means than during the first part of said stroke; differential friction wedge blocks having wedging engagement with the wedge means and frictional engagement with the longitudinal friction surfaces of the casing; and a spring resistance opposing movement of the friction wedge blocks inwardly of the post.

A still further object of the invention is to provide a high capacity friction shock absorbing mechanism, the releasing action of which is substantially instantaneous, the mechanism including a relatively movable post and casing, spring resisted friction wedge shoes having frictional engagement with the casing and friction wedge blocks having frictional engagement with the casing and wedging engagement with the shoes and post, wherein the post and blocks are provided with sets of cooperating keen and blunt wedge faces acting successively during compression of the mechanism to effect relatively light initial and heavier final resistance, the blunt wedge faces facilitating release and the shoes being frictionally retarded during the releasing action, thereby relieving the wedge blocks of lateral pressure to instantaneously free the same from the post, substantially the entire expansion force of the springs being thus utilized during the initial releasing action to project the wedge system outwardly away from the post.

Other objects of the invention will more clearly appear from the description and claims hereinafter following.

In the drawings forming a part of this specification, Figure 1 is a horizontal longitudinal sectional view of a portion of the underframe structure at one end of a railway car, illustrating my improvements in connection therewith. Figure 2 is a longitudinal vertical sectional view corresponding substantially to the line 2—2 of Figure 1. And Figures 3 and 4 are vertical transverse sectional views corresponding respectively to the lines 3—3 and 4—4 of Figure 2.

In said drawings, 10—10 indicate channel shaped center or draft sills of a railway car underframe having the usual front stop lugs 11—11 and rear stop lugs 12—12, secured to the inner sides thereof. The inner end portion of the coupler shank is designated by 13, to which is operatively connected a hooded yoke 14, of well known form. My improved shock absorbing mechanism, proper, is disposed within the yoke and the yoke in turn is supported in operative position by a detachable saddle plate 15, secured to the bottom flanges of the sills 10.

My improved shock absorbing mechanism, proper, comprises, broadly, a friction casing A; a follower casing B having a wedge post thereon; a pair of friction wedge blocks C—C; a pair of friction shoes D—D; a main spring resistance comprising twin arranged members E—E; and a retainer bolt F.

The friction casing A is in the form of a substantially rectangular box-like member, open at the inner end, and having spaced longitudinally disposed vertical side walls 16—16; horizontally disposed longitudinal spaced top and bottom walls 17—17; and a transverse vertical front end wall 18. As shown, the end wall 18 is relatively heavy and functions as a front follower proper, cooperating with the stop lugs 11—11. The transverse vertical inner surface of the wall 18 forms a friction surface 19 cooperating with the wedge blocks C—C. The side walls 16 of the casing are provided with longitudinally disposed friction surfaces 20—20 which cooperate with the friction shoes D. The wall 18 is also provided with a pocket 21 on the inner side thereof adapted to receive the head of the retainer bolt, the pocket 21 having an inwardly opening portion through which the head of the bolt may be inserted when assembling the mechanism, so as to bring the same into shouldered engagement with the inner wall of the pocket.

The casing B is also in the form of a rectangular box-like member, open at the inner end, and has horizontally disposed spaced top and bottom walls 22—22, vertically disposed spaced side walls 23—23 and a transverse vertical rear end wall 24 cooperating with the stop lugs 12, in the manner of the usual rear follower. The casing B is provided with an integral column or post 25, which extends forwardly from the transverse end wall and is disposed along the longitudinal center line of the mechanism. The post 25 has a solid portion 26 at the forward end thereof, having opposed exterior wedge faces 27—27 at the extreme outer end thereof. The wedge faces 27, as most clearly shown in Figure 1, converge forwardly of the mechanism and are disposed at relatively keen angles with respect to the longitudinal axis of the mechanism. Rearwardly of the wedge faces 27 the solid portion 26 of the post is provided with two additional wedge faces 28—28, disposed on opposite sides of the same but arranged at blunter angles with respect to the axis of the mechanism, than the wedge faces 27. The main body portion of the post, between the solid part 26 and the transverse end wall 24 of the casing B, is formed by a vertical web 29, reinforced by longitudinally extending central ribs 30—30 on opposite sides thereof and by top and bottom ribs 31—31 forwardly beyond the front end of the casing B, the rear end of the web 29 being formed integral with the top and bottom walls 22 of the casing. At the extreme inner end, the post 25 is provided with a hollow tube-like portion 32 adapted to accommodate the nut of the retainer bolt F. The tubular portion is of such a length as to permit the necessary amount of relative movement between the bolt and the casing B during the compression stroke of the gear.

The wedge blocks C are of similar design and are disposed on opposite sides of the post 25, within the casing A. Each block has a flat front end face 33 adapted to slide laterally on the friction surface 19 of the end wall of the casing. At the extreme inner end, each block C is provided with a relatively blunt wedge face 34 at the inner side thereof correspondingly inclined to and adapted to cooperate with the blunt wedge face 28 at the same side of the post 25. Forwardly of the wedge face 34, the block C is provided with an additional wedge face 35 disposed at a relatively keen angle with respect to the axis of the mechanism and adapted to engage the keen wedge face 27 at the corresponding side of the post. As shown in Figure 1, in the normal full release position of the mechanism, the keen wedge faces 35 of the blocks C are in engagement with the keen wedge faces 27 of the post, while the blunt wedge faces 34 are spaced from the corresponding blunt faces of the post. On the outer side, at the inner end thereof, each block C is provided with a wedge face 36 adapted to cooperate with one of the friction shoes D.

The friction shoes D are disposed at opposite sides of the casing A and have frictional engagement with the side walls thereof. The shoes D are of similar design, each having a transverse rear end face 37 adapted to form an abutment for the outer ends of the corresponding twin arranged spring members. On the outer side, each shoe D presents a longitudinally disposed flat friction surface 38 engaging the inner friction surface 20 of the corresponding side wall of the casing A. On the inner side, each shoe is provided with a wedge face 39 engaging the wedge face 36 of the block C at the same side of the mechanism. The main spring resistance comprises two sets of twin arranged coils at opposite sides of the post 25. The members of each pair are arranged in vertical alinement and are interposed between the transverse end wall 24 of the casing B and the inner ends of the friction shoes D. The spring coils are of such a size as to occupy substantially the entire available space between the post and the side walls of the casing B, and, as shown in Figures 3 and 4, are held centered by the rib members of the post. In order to accommodate the front end portions of the spring coils, the opposite sides of the solid portion of the post 25 are recessed at the top and bottom, as indicated at 40—40.

The retainer bolt F has the head thereof anchored to the casing A and the nut anchored to the casing B, the shank of the bolt extending through a longitudinal bore 41 provided in the post 25. The head of the bolt has shouldered engagement with the inner end wall of the pocket 21 of the casing A, while the nut engages the transverse end wall of the bore in the tubular section 32 of the post and has movement rearwardly in said tubular section during the compression of the mechanism. In addition to holding the mechanism assembled, the retainer bolt also serves to maintain the over-all longitudinal dimensions of the same.

In assembling the mechanism, the head of the retainer bolt is anchored in the pocket 21 of the casing A and the wedge blocks C and friction shoes D are placed in position within the casing A; the casing B with the springs placed therein is then assembled with the casing A by entering the retainer bolt through the bore of the post and telescoping the post within the casing A.

The operation of my improved shock absorbing mechanism, during a compression stroke, is as follows. The casings A and B will be moved relatively toward each other, thereby forcing the wedge blocks C inwardly of the post 25 and along the keen wedge faces 27 thereof. Due to the wedging action thus had between the blocks C and the post, the blocks C will be wedged apart, sliding on the transverse friction surface 19 of the casing A. Inasmuch as the blocks C have wedging engagement with the friction shoes D and the latter are held against lateral outward movement by the side walls of the casing, the shoes D will be wedged inwardly of the mechanism along the side walls of the casing against the resistance of the main spring E. As will be evident, frictional resistance is thus had between the shoes D and the walls of the casing A, between the transverse friction surface of the casing and the blocks C, while both frictional and wedging engagement is had between the cooperating wedge faces of the blocks C and the post and the cooperating wedge faces of the blocks C and shoes D. The action just described will continue until the blocks C have been moved inwardly of the post to such an extent that the blunt wedge faces 34 of the blocks will engage the blunt wedge faces 28 of the post. When these faces are brought into wedging engagement, the blocks C will be forced apart at a greater rate of speed than during the cooperation thereof with the keen wedge faces of the post, thereby producing more rapid inward wedging action of the friction shoes D and compressing the main spring E correspondingly. As will be evident, the resistance offered during the last part of the compression stroke is thus greatly in excess of that had during the first part of the stroke. In addition to the greater compression of the spring resistance, during the last part of the compression stroke, the frictional resistance is also greatly augmented due to the greater amount of movement of the shoes D on the longitudinal friction surfaces of the casing A and the greater amount of lateral sliding movement of the blocks C on the transverse friction surface of the casing A. Compression of the mechanism is limited by engagement of the inner ends of the casings A and B. The parts are so proportioned that the front end of the post 25 will be engaged by the transverse wall 18 of the casing A at the same time that the casings engage each other. As will be evident, the spring resistance E is thus relieved of further compression and the actuating force is transmitted through the casings A and B and the post 25 directly to the stop lugs of the draft sills, these elements acting as a solid column load transmitting means.

When the actuating force is reduced, upon release of the mechanism, the friction shoes, together with the casing A and the wedge blocks C will be immediately projected outwardly by the expansive action of the main spring resistance E. This immediate release of the wedge blocks C from the post 25 is due to the relatively blunt angles of the engaging faces 34 and 28 thereof. The blunt faces of the wedge blocks are free to drop away from the post, inasmuch as these blocks are relieved from lateral inward pressure, especially during the initial part of the releasing action. During the initial releasing action, forward movement of the friction shoes C with respect to the casing A is retarded by the frictional engagement between the shoes and the side walls of the casing, thus carrying the casing forwardly with the shoes. On account of this retarding action, the wedging action of the shoes on the wedge blocks C is greatly reduced, thereby correspondingly reducing the pressure between the blocks C and the blunt wedge faces of the post. The casing A, together with the wedge blocks C and shoes D, will be carried outwardly until limited by the retainer bolt F. During this action, after the blocks C have been released from the post, the shoes D will act to wedge the blocks laterally inwardly and bring them into engagement with the keen wedge faces of the post, as shown in Figure 1.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having longitudinally and transversely disposed friction surfaces; of a post having a plurality of faces at each side thereof angularly disposed with respect to each other and all angularly disposed with respect to the longitudinal axis of the mechanism, said post and casing being relatively movable toward and away from each other; friction wedge blocks having frictional engagement with the transverse walls of the casing, each block having a plurality of faces on the inner side thereof similarly disposed respectively to faces at the same side of the post and cooperating therewith successively; friction shoes cooperating with the longitudinal surfaces of the casing and having wedging engagement with the wedge blocks; and spring resistance means opposing relative movement of the shoes and post.

2. In a friction shock absorbing mechanism, the combination with a friction casing having longitudinally and transversely disposed friction surfaces; of a column member having outer wedge faces at opposite sides thereof, additional wedge faces on said column inwardly of said first named faces, and angularly disposed thereto; wedge friction blocks having frictional engagement with the transversely disposed surfaces of the casing, each block having a wedge face correspondingly inclined to and cooperating with the outer wedge face at one side of the column, and an additional wedge face correspondingly inclined to and cooperating with the additional wedge face at the same side of the column, said wedge faces of the block cooperating respectively with the wedge faces of the post and engaging the same successively; friction shoes having sliding frictional engagement with the longitudinal friction surfaces of the casing; and spring resistance means opposing relative movement of the shoes and column.

3. In a friction shock absorbing mechanism, the combination with a casing having interior transverse and longitudinally disposed friction surfaces; of a column having wedge faces at opposite sides thereof disposed at relatively keen angles with respect to the longitudinal axis of the mechanism and additional wedge faces at opposite sides thereof disposed at relatively blunt angles with respect to said axis; wedge blocks having frictional engagement with the transverse friction surfaces of the casing, each block having a keen and a blunt wedge face cooperating respectively with the keen and blunt faces at the same side of the column; friction shoes having sliding engagement with the longitudinal friction surfaces of the casing and wedging engagement with the wedge blocks; and spring resistance means opposing relative movement of the friction shoes and column.

4. In a friction shock absorbing mechanism, the combination with a friction casing having longitudinally and transversely disposed interior friction surfaces; of a column member having a set of wedge faces on each side thereof, the wedge faces of each set being arranged in succession lengthwise of the column, one of the wedge faces of each set being disposed at a relatively keen angle and the other face at a relatively blunt angle with respect to the longitudinal axis of the mechanism; friction wedge blocks having frictional engagement with the transverse friction surfaces of the casing, each of said blocks having a keen and a blunt wedge face arranged in succession lengthwise of the same and cooperating respectively with the keen and blunt wedge faces at the same side of the column; friction shoes having frictional engagement with the longitudinal friction surfaces of the casing and wedging engagement with the wedge blocks; and spring resistance means opposing relative movement of the shoes and column.

5. In a friction shock absorbing mechanism, the combination with a follower casing having transversely and longitudinally disposed friction surfaces; of a column member having a pair of outer wedge faces on opposite sides thereof disposed at relatively keen angles with respect to the longitudinal axis of the mechanism, and a pair of additional wedge faces at opposite sides thereof disposed inwardly of said keen faces and inclined to said axis at relatively blunt angles, said column and casing being relatively movable toward and away from each other; a pair of wedge friction blocks disposed at opposite sides of the column within said casing and having frictional engagement with the transverse friction surfaces of the casing, each of said blocks having a relatively blunt wedge face at the inner end and a keen wedge face disposed outwardly of said blunt face, said keen and blunt faces of the blocks being adapted to cooperate respectively in sequence with keen and blunt faces at the same side of the column; friction shoes having wedging engagement with the blocks and frictional engagement with the longitudinal surfaces of the casing; and spring resistance means opposing relative longitudinal movement of the shoes and column.

In witness that I claim the foregoing I have hereunto subscribed my name this 11th day of April, 1929.

JOHN F. O'CONNOR.